Figure 1:
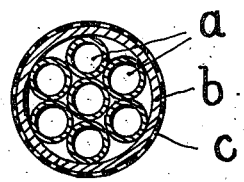

G. HILDEBRANDT.
HEAT EXCHANGE PIPING.
APPLICATION FILED JAN. 3, 1910.

979,762.

Patented Dec. 27, 1910.

UNITED STATES PATENT OFFICE.

GOTTHOLD HILDEBRANDT, OF SPANDAU-TIEFWERDER 29B, NEAR BERLIN, GERMANY.

HEAT-EXCHANGE PIPING.

979,762.  Specification of Letters Patent.  Patented Dec. 27, 1910.

Application filed January 3, 1910. Serial No. 536,098.

*To all whom it may concern:*

Be it known that I, GOTTHOLD HILDEBRANDT, engineer, citizen of Germany, subject of the King of Prussia and Emperor of Germany, residing at Spandau-Tiefwerder, 29$^b$ near Berlin, in the Kingdom of Prussia and Empire of Germany, have invented new and useful Improvements in a Heat-Exchange Piping, of which the following is a specification.

My invention relates to tubular conduits for devices in which exchange of heat takes place, particularly for apparatus for producing cold, as in machines for liquefying air and the like.

A primary object of my invention is to provide an improved conduit or piping comprising a bundle or nest of tubes contacting one with another and with an outer inclosing tube or pipe. In this manner I obtain the advantage that the piping forms an entirety firmly joined together, which can be bent and deformed in any optional manner without the internal special conditions materially changing. Another advantage, particularly when my piping is employed in apparatus for producing cold, consists in the contacting or cooling surfaces of the materials, the heat of which is to be exchanged, being considerably increased. This is important particularly when the piping is used as a counter-current conduit. Lastly, in the case of the subject-matter of my invention the process of manufacture is very much simplified, as no kind of soldered joints or other attachment and stiffening means are requisite for connecting the internal and external tubes, but, on the contrary, by simply drawing in the tubes they are fixed immovably in the inclosing tube or pipe.

For the external tube or pipe I preferably employ a soft, compressible metal, e. g. lead, which snugs closely around the inner tubes and becomes connected firmly with them. For increasing the resistance to pressure and simultaneously improving the insulation toward the outside I coat the lead pipe with an insulating material which possesses simultaneously considerable strength and slight extensibility; for this, strips of firm, stiff textile material, such as e. g. tape, canvas and the like, wound or plaited around the pipe are particularly suitable. Owing to this covering the lead pipe is able to resist internal pressure and mechanical injury from without.

When employed as counter-current conduits in apparatus for producing cold the internal tubes of my improved piping are preferably used as high pressure conduit and the spaces between them or between their walls and the wall of the inclosing pipe as cooling conduit. To this end, I preferably make the internal tubes of a pressure-resisting material, e. g. flexible copper. When using the piping in this manner I obtain the advantage that the tubes forming the nest of tubes are constantly held more securely one against another and in the inclosing pipe by the internal high pressure; further, the exterior surface which is more exposed to the exchange of heat with the surroundings is diminished to a very small amount relatively to the operative internal cooling area, so that the losses of energy owing to reception of heat from without are diminished.

My improved piping also affords the opportunity of simultaneously dealing with more than two different liquids or gases for exchange of heat.

One illustrative embodiment of my invention is represented by way of example in the accompanying drawing wherein:—

Figure 2:
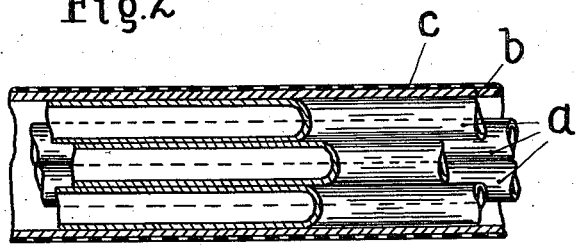
Figure 3:
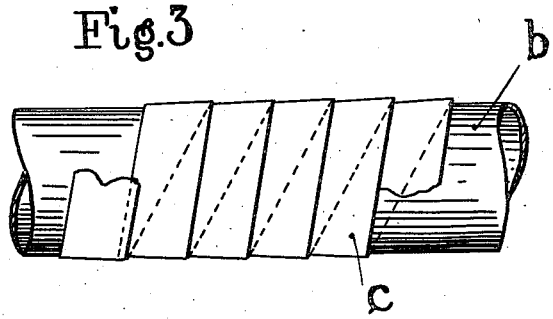

Figure 1 is a cross-section, Fig. 2 a side elevation, partly in longitudinal section and partly broken away, and Fig. 3 a side elevation showing a portion of a half finished conduit according to my invention.

Referring to the drawing, the internal tubes $a$ contact closely and tightly one with another and with the external tube or pipe $b$. As seen in Fig. 3, the outside pipe $b$ has wound around it a strip of textile material or a band $c$. When the internal tubes $a$ and the external pipe $b$ consist of flexible material the piping can be bent optionally when being fitted up and laid without the position of the internal tubes $a$ relatively to one another and to the inclosing pipe $b$ being changed, as will be understood from the drawing.

Having now described my invention what I claim and desire to secure by Letters Patent of the United States is:

1. A heat exchange pipe comprising an outer tube of pliable metal and a plurality of flexible inner tubes inclosed by said outer tube and arranged closely together therein to snugly contact with each other and with the inner wall of the outer tube.

2. Heat-exchange piping comprising a bundle of flexible tubes inclosed by an outer pipe, the inner tubes contacting one with another and with said outer pipe, said outer pipe consisting of lead, with strips of canvas wound around it.

3. A heat exchange piping comprising a bundle of flexible tubes inclosed by an outer pipe of pliable metal, the inner tubes contacting one with another and with the inner wall of said pipe, said pipe being surrounded with an insulated material.

In testimony whereof I have hereunto set my hand in presence of two subscribing witnesses.

GOTTHOLD HILDEBRANDT.

Witnesses:
WOLDEMAR HAUPT,
HENRY HASPER.